US012608770B2

(12) United States Patent
Zheng

(10) Patent No.: US 12,608,770 B2
(45) Date of Patent: Apr. 21, 2026

(54) IMAGE PROCESSING METHOD AND APPARATUS

(71) Applicant: Beijing Zitiao Network Technology Co., Ltd., Beijing (CN)

(72) Inventor: Yexin Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 163 days.

(21) Appl. No.: 18/569,554

(22) PCT Filed: Sep. 7, 2022

(86) PCT No.: PCT/CN2022/117557
§ 371 (c)(1),
(2) Date: Dec. 12, 2023

(87) PCT Pub. No.: WO2023/036181
PCT Pub. Date: Mar. 16, 2023

(65) Prior Publication Data
US 2024/0386526 A1      Nov. 21, 2024

(30) Foreign Application Priority Data

Sep. 10, 2021      (CN) .......................... 202111062473.0

(51) Int. Cl.
*G06T 5/50*          (2006.01)
*G06T 5/92*          (2024.01)
*G06T 11/00*         (2006.01)
(52) U.S. Cl.
CPC .................. *G06T 5/50* (2013.01); *G06T 5/92* (2024.01); *G06T 11/001* (2013.01);
(Continued)

(58) Field of Classification Search
CPC . G06T 5/50; G06T 5/92; G06T 11/001; G06T 2207/10024; G06T 2207/20208; G06T 2207/20221; H04N 9/64
(Continued)

(56) References Cited

U.S. PATENT DOCUMENTS

| | | | |
|---|---|---|---|
| 11,942,016 B2 * | 3/2024 | Park ..................... | G09G 3/3233 |
| 2004/0239966 A1 | 12/2004 | Larson | |

(Continued)

FOREIGN PATENT DOCUMENTS

| | | |
|---|---|---|
| CN | 105744159 A | 7/2016 |
| CN | 107111980 A | 8/2017 |

(Continued)

OTHER PUBLICATIONS

Ming Liu, "Research and Implementation of High Dynamic Range Image Technology in LCD Display", Communications and Radio and Television, Iss. 04, Dec. 15, 2017, 18 pages.

(Continued)

*Primary Examiner* — Prabodh M Dharia
(74) *Attorney, Agent, or Firm* — Astute IP Law Group

(57) ABSTRACT

An image processing method and related apparatuses are provided. The method includes: converting colors of pixels of a foreground image into optical signals under a second color display standard to obtain a first optical signal set; converting the optical signals in the first optical signal set according to the conversion coefficient to obtain a second optical signal set; converting colors of pixels of the background image into optical signals under the second color display standard to obtain a third optical signal set; fusing optical signals in the second optical signal set and the third optical signal set based on a light transmittance of the foreground image to obtain a fourth optical signal set; and converting optical signals in the fourth optical signal set into
(Continued)

500

Image Processing Apparatus

First Conversion Unit ⌇—51

Conversion Coefficient Obtaining Unit ⌇—52

Second Conversion Unit ⌇—53

54⌇—  Third Conversion Unit

Fusion Unit ⌇—55

Fused Image Obtaining Unit ⌇—56 colors in the second color space to obtain the fused image of the foreground image and the background image.

20 Claims, 4 Drawing Sheets

(52) U.S. Cl.
CPC ............... *G06T 2207/10024* (2013.01); *G06T 2207/20208* (2013.01); *G06T 2207/20221* (2013.01)

(58) Field of Classification Search
USPC .......................................................... 345/604
See application file for complete search history.

(56) References Cited

U.S. PATENT DOCUMENTS

| | | | | |
|---|---|---|---|---|
| 2008/0143739 | A1* | 6/2008 | Harris | G09G 5/377 |
| | | | | 345/604 |
| 2017/0070709 | A1* | 3/2017 | Sato | H04N 23/66 |
| 2017/0085833 | A1 | 3/2017 | Toma et al. | |
| 2017/0332071 | A1* | 11/2017 | Ledentsov | G06T 19/006 |
| 2018/0063404 | A1 | 3/2018 | Chen et al. | |
| 2018/0241979 | A1* | 8/2018 | Kanda | H04N 5/57 |
| 2020/0143202 | A1* | 5/2020 | Chellappan | G06F 18/23 |
| 2021/0409643 | A1* | 12/2021 | Toma | H04N 5/20 |
| 2022/0277039 | A1* | 9/2022 | Aggarwal | G06F 16/51 |

FOREIGN PATENT DOCUMENTS

| | | |
|---|---|---|
| CN | 107851421 A | 3/2018 |
| CN | 108370428 A | 8/2018 |
| CN | 109155060 A | 1/2019 |
| CN | 110177230 A | 8/2019 |
| CN | 110447051 A | 11/2019 |
| CN | 111260601 A | 6/2020 |
| CN | 111738970 A | 10/2020 |
| CN | 112689138 A | 4/2021 |
| CN | 112950510 A | 6/2021 |
| JP | 2005252392 A | 9/2005 |
| JP | 2018107649 A | 7/2018 |
| JP | 2018121222 A | 8/2018 |

OTHER PUBLICATIONS

Merianos et al., "A hybrid multiple exposure image fusion approach for HDR image synthesis", 2016 IEEE International Conference on Imaging Systems and Techniques (IST), Nov. 10, 2016, 5 pages.
Office Action for Chinese Patent Application No. 202111062473.0, mailed on Oct. 31, 2025, 20 pages.

* cited by examiner

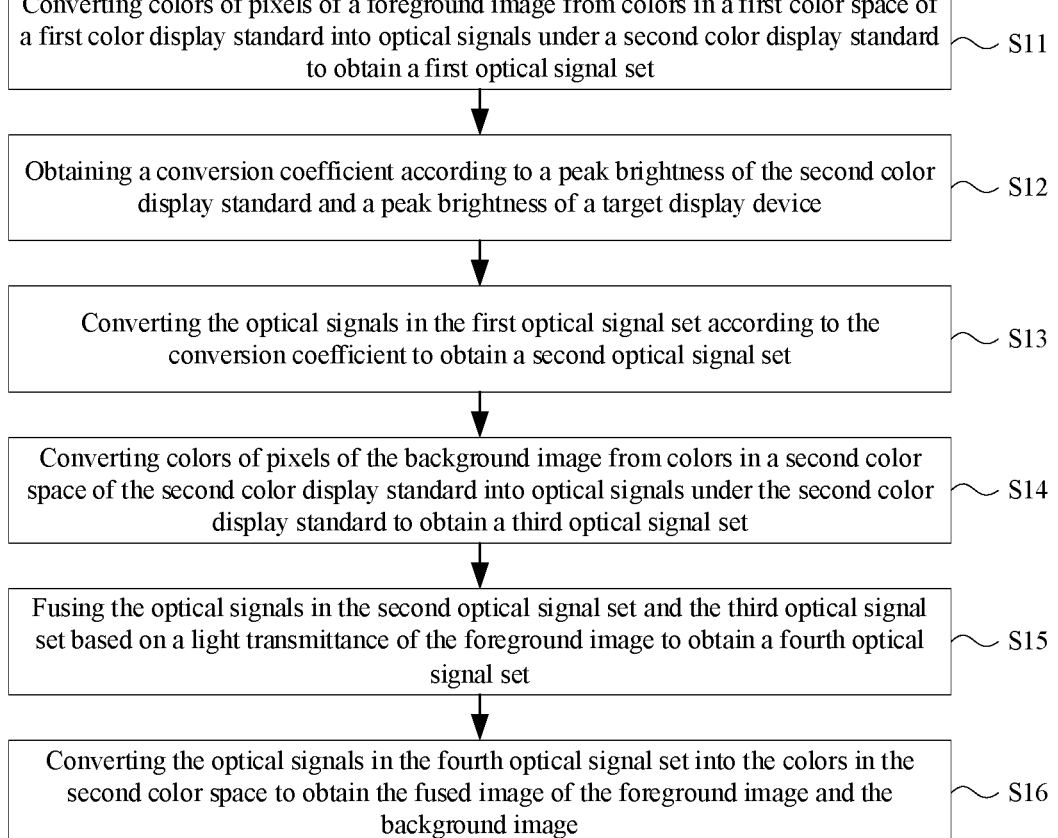

Converting colors of pixels of a foreground image from colors in a first color space of a first color display standard into optical signals under a second color display standard to obtain a first optical signal set          S11

Obtaining a conversion coefficient according to a peak brightness of the second color display standard and a peak brightness of a target display device          S12

Converting the optical signals in the first optical signal set according to the conversion coefficient to obtain a second optical signal set          S13

Converting colors of pixels of the background image from colors in a second color space of the second color display standard into optical signals under the second color display standard to obtain a third optical signal set          S14

Fusing the optical signals in the second optical signal set and the third optical signal set based on a light transmittance of the foreground image to obtain a fourth optical signal set          S15

Converting the optical signals in the fourth optical signal set into the colors in the second color space to obtain the fused image of the foreground image and the background image          S16

FIG. 1

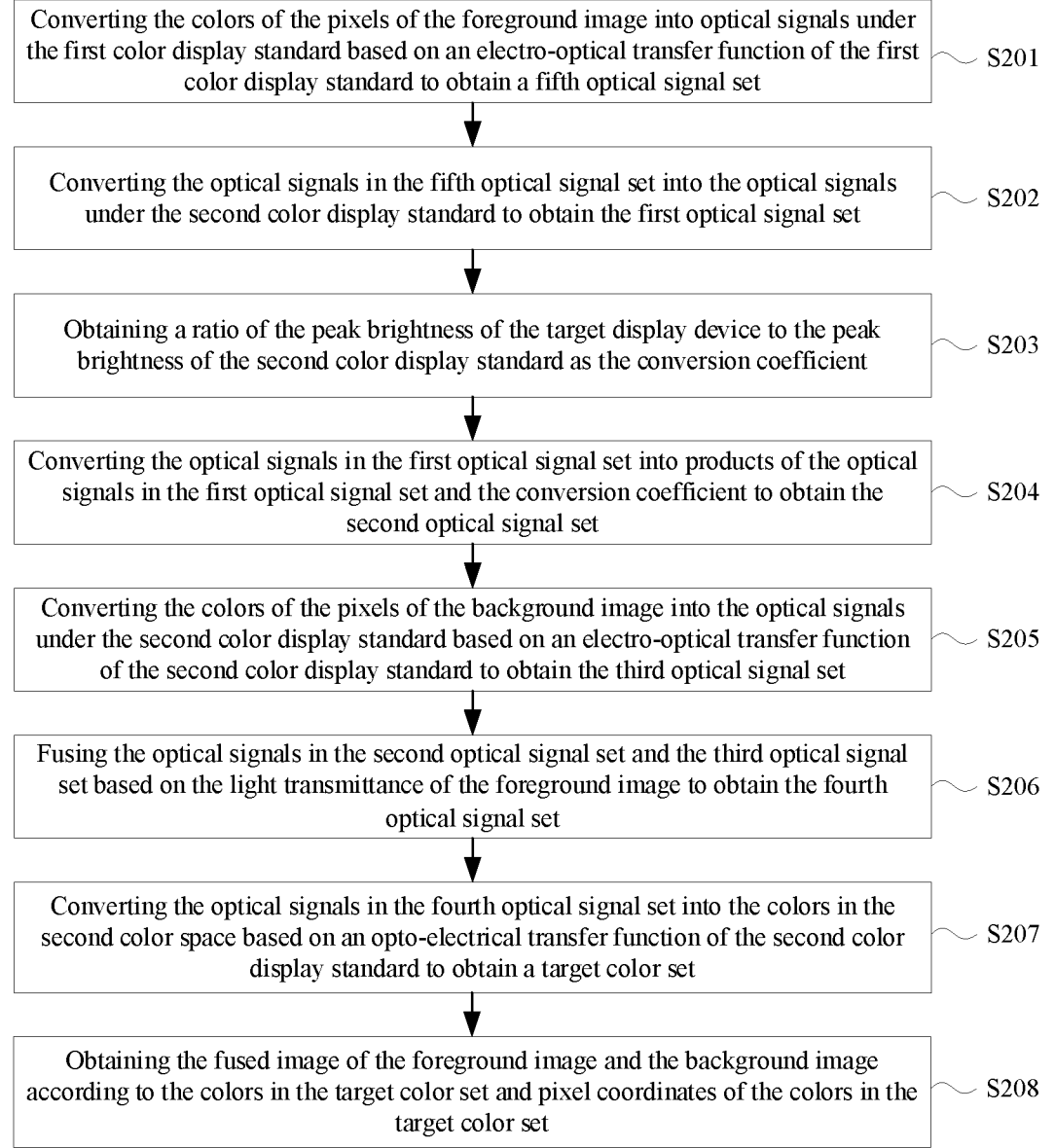

Converting the colors of the pixels of the foreground image into optical signals under the first color display standard based on an electro-optical transfer function of the first color display standard to obtain a fifth optical signal set ⟶ S201

Converting the optical signals in the fifth optical signal set into the optical signals under the second color display standard to obtain the first optical signal set ⟶ S202

Obtaining a ratio of the peak brightness of the target display device to the peak brightness of the second color display standard as the conversion coefficient ⟶ S203

Converting the optical signals in the first optical signal set into products of the optical signals in the first optical signal set and the conversion coefficient to obtain the second optical signal set ⟶ S204

Converting the colors of the pixels of the background image into the optical signals under the second color display standard based on an electro-optical transfer function of the second color display standard to obtain the third optical signal set ⟶ S205

Fusing the optical signals in the second optical signal set and the third optical signal set based on the light transmittance of the foreground image to obtain the fourth optical signal set ⟶ S206

Converting the optical signals in the fourth optical signal set into the colors in the second color space based on an opto-electrical transfer function of the second color display standard to obtain a target color set ⟶ S207

Obtaining the fused image of the foreground image and the background image according to the colors in the target color set and pixel coordinates of the colors in the target color set ⟶ S208

FIG. 2

IMAGE PROCESSING METHOD AND APPARATUS

CROSS REFERENCE TO RELATED APPLICATION

The present application is a national phase of International Patent Application No. PCT/CN2022/117557, filed on Sep. 7, 2022, which claims priority of Chinese Patent application No. 202111062473.0, titled "IMAGE PROCESSING METHOD AND APPARATUS" and filed with State Intellectual Property Office of China on Sep. 10, 2021, the disclosures of which are incorporated herein by reference in their entireties.

TECHNICAL FIELD

The present disclosure relates to an image processing technology field, especially to an image processing method and apparatus.

BACKGROUND

When image processing is performed, there is often a need to superpose and fuse a plurality of images to generate a fused image. For example, when a sticker effect is added to an original image, an image sticker made in advance needs to be superposed over and fused with the original image to generate a fused image including the sticker effect.

When image superposition and fusion is performed, if a background image and a foreground image are the same in color display standard, the background image and the foreground image may be fused directly based on a preset light transmittance to generate a fused image achieving an expected effect. However, since different color display standards differ in color space, three primary colors, and brightness range, the superposition and fusion of a foreground image under one color display standard with a background image under another color display standard will result in that the color and the like of a fused image do not achieve expected effects. Therefore, images under different color display standards cannot be superposed and fused. For example, when a foreground image is a sticker under a standard dynamic range (SDR) color display standard and a background image is an image under a high dynamic range (HDR) color display standard, since the color space of the SDR color display standard is bt.709, the brightness range is 0 to 100 nit; and the color space of the HDR color display standard is bt.2020 and the brightness range is 0 to 10000 nit. Therefore, if the sticker under the SDR color display standard is directly superposed over and fused with the background image under the HDR color display standard, it may result in a phase change and a low brightness of the sticker color region in the fused image, and a pre-designed sticker effect cannot be achieved.

SUMMARY

In view of the above, embodiments of the present disclosure provide an image processing method and an apparatus, which are used to solve the problem of the abnormal fused image due to superimposing and fusing images under different color display standards.

In order to achieve above purpose, the embodiments of the present disclosure provide following technical solutions.

On the first aspect, the embodiments of the present disclosure provide an image processing method, comprising:

converting colors of pixels of a foreground image from colors in a first color space of a first color display standard into optical signals under a second color display standard to obtain a first optical signal set; obtaining a conversion coefficient according to a peak brightness of the second color display standard and a peak brightness of a target display device, wherein the target display device is a device for displaying a fused image of the foreground image and a background image; converting the optical signals in the first optical signal set according to the conversion coefficient to obtain a second optical signal set; converting colors of pixels of the background image from colors in a second color space of the second color display standard into optical signals under the second color display standard to obtain a third optical signal set; fusing optical signals in the second optical signal set and the third optical signal set based on a light transmittance of the foreground image to obtain a fourth optical signal set; and converting optical signals in the fourth optical signal set into colors in the second color space to obtain the fused image of the foreground image and the background image.

On the second aspect, the embodiments of the present disclosure provide an image processing apparatus, comprising: a first conversion unit configured to convert colors of pixels of a foreground image from colors in a first color space of a first color display standard into optical signals under a second color display standard to obtain a first optical signal set; a conversion coefficient obtaining unit configured to obtain a conversion coefficient according to a peak brightness of the second color display standard and a peak brightness of a target display device, wherein the target display device is a device for displaying a fused image of the foreground image and a background image; a second conversion unit configured to convert the optical signals in the first optical signal set according to the conversion coefficient to obtain a second optical signal set; a third conversion unit configured to convert colors of pixels of the background image from colors in a second color space of the second color display standard into optical signals under the second color display standard to obtain a third optical signal set; a fusion unit configured to fuse optical signals in the second optical signal set and the third optical signal set based on a light transmittance of the foreground image to obtain a fourth optical signal set; and a fused image obtaining unit configured to convert optical signals in the fourth optical signal set into the colors in the second color space to obtain the fused image of the foreground image and the background image.

On the third aspect, the embodiments of the present disclosure provide an electronic device, comprising a memory and a processor, wherein the memory is configured to store a computer program; and the processor is configured to, when executing the computer program, enable the electronic device to implement the image processing method provided by any one of the above embodiments.

On the fourth aspect, the embodiments of the present disclosure provide a computer-readable storage medium, storing a computer program, wherein the image processing method provided by any one of the above embodiments is implemented when the computer program is executed by a computing device.

On the fifth aspect, the embodiments of the present disclosure provide a computer program product, wherein the image processing method provided by any one of the above embodiments is implemented when the computer program product is run on a computer.

The image processing method provided by the embodiments of the present disclosure comprises: converting colors of pixels of a foreground image from colors in a first color space of a first color display standard into optical signals under a second color display standard to obtain a first optical signal set; obtaining a conversion coefficient according to a peak brightness of the second color display standard and a peak brightness of a target display device, wherein the target display device is a device for displaying a fused image of the foreground image and a background image; converting the optical signals in the first optical signal set according to the conversion coefficient to obtain a second optical signal set; converting colors of pixels of the background image from colors in a second color space of the second color display standard into optical signals under the second color display standard to obtain a third optical signal set; fusing optical signals in the second optical signal set and the third optical signal set based on a light transmittance of the foreground image to obtain a fourth optical signal set; and converting optical signals in the fourth optical signal set into colors in the second color space to obtain the fused image of the foreground image and the background image.

BRIEF DESCRIPTION OF THE DRAWINGS

The accompanying drawings, which are hereby incorporated in and constitute a part of the present description, illustrate embodiments of the present disclosure, and together with the description, serve to explain the principles of the embodiments of the present disclosure.

To describe the technical solutions in the embodiments of the present disclosure or in the prior art more clearly, the accompanying drawings required in the description of the embodiments or the prior art will be described briefly below. Apparently, other accompanying drawings can also be derived from these drawings by those ordinarily skilled in the art without creative efforts.

FIG. 1 is a first flowchart of an image processing method provided in an embodiment of the present disclosure;

FIG. 2 is a second flowchart of an image processing method provided in an embodiment of the present disclosure;

DETAILED DESCRIPTION

Figure 3:
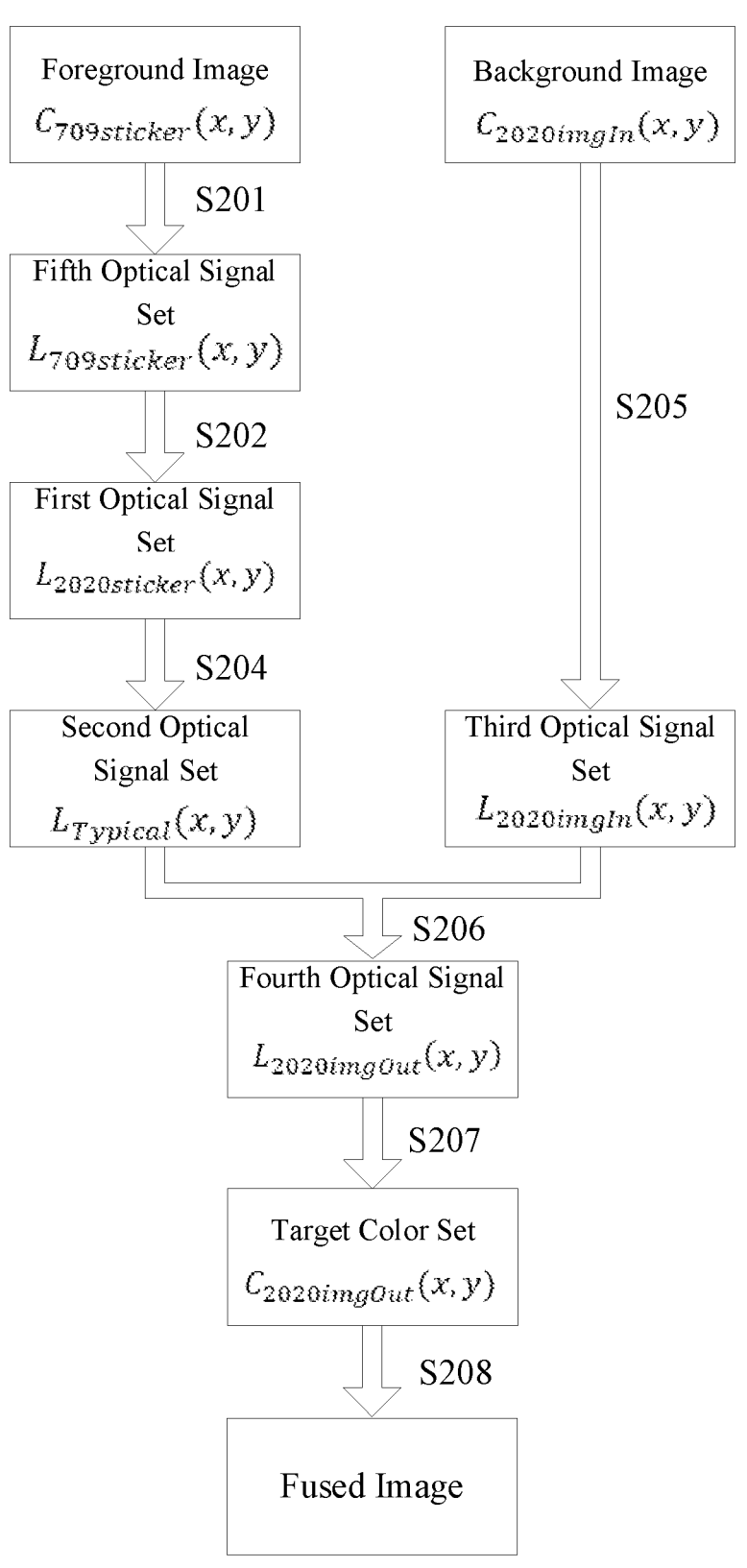
FIG. 3 is a schematic diagram of a data flow of an image processing method provided in an embodiment of the present disclosure.

To provide a clearer understanding of the objectives, features, and advantages of the embodiments of the present disclosure, the solutions in the embodiments of the present disclosure will be further described below. It should be noted that the embodiments in the present disclosure and features in the embodiments may be combined with one another without conflict.

Many specific details are described below to help fully understand the embodiments of the present disclosure. However, the embodiments of the present disclosure may also be implemented in other manners different from those described herein. Apparently, the described embodiments in the specification are merely some rather than all of the embodiments of the present disclosure.

In the embodiments of the present disclosure, the words such as "exemplary" or "for example" are intended to represent serving as an example, instance or illustration. Any embodiment or design solution described herein as "exemplary" or "for example" in the embodiments of the present disclosure should not be construed as being more preferred or advantageous over other embodiments or design solutions. Exactly, the words such as "exemplary" or "for example" are intended to present related concepts specifically. Moreover, in the description embodiments of the present disclosure, unless otherwise specified, "a plurality of" means two or more.

A performing agent of the image processing method provided in embodiments of the present disclosure may be an image processing apparatus. The image processing apparatus may be a mobile phone, a Pad, a laptop, a palmtop, a vehicle-mounted terminal, an ultra-mobile personal computer (UMPC), a netbook, a personal digital assistant (PDA), a personal computer (PC), or the like, which will not be particularly limited in the embodiments of the present disclosure.

Self-defined terms in the embodiments of the present disclosure are explained below:

First color display standard: it is defined as a color display standard with which a foreground image complies. The following description is made by taking for example that the first color display standard is the SDR color display standard. However, the embodiments of the present disclosure are not limited thereto. The first color display standard may also be other color display standards which may be applicable to the technical solutions provided in the embodiments of the present disclosure as long as the first color display standard and a second color display standard are different color display standards.

First color space: it is defined as a color space of the first color display standard. In the case that the first color display standard is an SDR color display standard, the first color space is bt.709.

Second color display standard: it is defined as a color display standard with which a background image complies. The following description is made by taking for example that the second color display standard is an HDR color display standard. Likewise, the embodiments of the present disclosure are not limited thereto. The second color display standard may also be other color display standards which may be applicable to the technical solutions provided in the embodiments of the present disclosure as long as the first color display standard and the second color display standard are different color display standards.

Second color space: it is defined as a color space of the second color display standard. When the second color display standard is the HDR color display standard, the second color space is bt.2020.

First optical signal set: it is an optical signal set obtained by converting colors of pixels of a foreground image into optical signals in the second color space. Since the second color space of the HDR color display standard is bt.2020, an optical signal in the first optical signal set is represented by $L_{2020sticker}(x,y)$ below.

Second optical signal set: it is an optical signal set obtained by converting the optical signals in the first optical signal set according to a conversion coefficient. An optical signal in the second optical signal set is represented by $L_{Typical}$(x,y) below.

Third optical signal set: it is an optical signal set obtained by converting colors of pixels of a background image into optical signals in the second color space. An optical signal in the third optical signal set is represented by $L_{2020imgIn}$(x, y) below.

Fourth optical signal set: it is an optical signal set obtained by fusing the optical signals in the second optical signal set and the third optical signal set based on a light transmittance of the foreground image. An optical signal in the third optical signal set is represented by $L_{2020imgOut}$(x,y) below.

Fifth optical signal set: it is an optical signal set obtained by converting the colors of the pixels of the foreground image into optical signals under the first color display standard. Since the color space of the SDR color display standard is bt.709, an optical signal in the fifth optical signal set is represented by $L_{709sticker}$(x,y) below.

Target color set: it is a color set obtained by converting the optical signals in the fourth optical signal set into the colors in the second color space. An optical signal in the target color set is represented by $C_{2020imgOut}$(x,y) below.

Based on the above contents, an embodiment of the present disclosure provides an image processing method. As shown in FIG. 1, the image processing method includes the following steps S11 to S16.

S11: converting colors of pixels of a foreground image from colors in a first color space of a first color display standard into optical signals under a second color display standard to obtain a first optical signal set.

The foreground image in the embodiment of the present disclosure refers to an image needed to be superposed over and fused with another image. The foreground image may be any image under the first color display standard. The embodiments of the present disclosure have no limitation on the type of the foreground image. Exemplarily, the foreground image may include an image sticker in special effect editing.

Exemplarily, the first color display standard may be an SDR color display standard, and the second color display standard may be an HDR color display standard.

The following embodiments are described by taking for example that the second color display standard is specifically a perceptual quantizer (PQ) color display standard of HDR color display standards. However, the embodiments of the present disclosure are not limited thereto. For example, the second color display standard in the embodiment of the present disclosure may also be a hybrid log gamma (HLG) color display standard of HDR color display standards.

Specifically, the PQ color display standard is an HDR color display standard. The color space of the PQ color display standard is color space bt.2020, the three primary colors thereof are three primary colors bt.2020, and an opto-electrical transfer function thereof is under SMPTE2084 standard. Compared with the PQ color display standard, allowable displayed maximum brightness of an SDR color display standard is lower. The color space of the PQ color display standard is color space bt.709, the three primary colors thereof are three primary colors bt.709, and an opto-electrical transfer function thereof is under ITU-RBT.1886 standard.

S12: obtaining a conversion coefficient according to a peak brightness of the second color display standard and a peak brightness of a target display device.

The target display device is a device for displaying a fused image of the foreground image and a background image.

Specifically, the peak brightness of the second color display standard in the embodiment of the present disclosure refers to a brightness value of a color with the maximum brightness in all the colors of the second color space. When the second color display standard is the PQ color display standard, the peak brightness of the second color display standard is 10000 nit. The peak brightness of the target display device in the embodiment of the present disclosure refers to the maximum brightness of the device for displaying the fused image of the foreground image and the background image.

S13: converting the optical signals in the first optical signal set according to the conversion coefficient to obtain a second optical signal set.

Specifically, when the foreground image of the first color display standard is fused with the background image of the second color display standard, a desired ideal effect is the same as a fusion effect of the foreground image and the background image of the second color display standard. If the optical signals in the first optical signal set are not converted according to the peak brightness of the second color display standard and the peak brightness of the target display device, and instead, brightness ranges of the first color display standard and the second color display standard are normalized and the brightness of each pixel of the foreground image is aligned to the second color display standard after the normalization, or the brightness of each pixel of the foreground image is directly used as a brightness input, abnormal brightness of the foreground image may be caused.

For example, in the case that the first color display standard is the SDR color display standard and the second color display standard is the PQ color display standard, the brightness range of the first color display standard is [0, 100] nit and the brightness range of the second color display standard is [0, 10000] nit. If the brightness ranges of the SDR color display standard and the PQ color display standard are directly normalized and the brightness of each pixel of the foreground image is aligned to the second color display standard after the normalization, the brightness of a pixel with low original brightness may be converted to a greater brightness value, leading to excessively high brightness of the foreground image. The expected effect is not achieved. If the brightness of each pixel of the foreground image is directly used as the brightness input, the brightness of the pixel with low original brightness will be displayed as a lower brightness value (the maximum brightness value 100 nit in SDR will also be displayed as a very small brightness value in the PQ color display standard), leading to excessively low brightness of the foreground image. The expected effect is not achieved.

The brightness of each pixel in an image is ultimately reflected by the display brightness of the screen of a display device. After the colors of the pixels of the foreground image are converted into optical signals under the second color display standard, the conversion coefficient is obtained according to the peak brightness of the second display standard, and the optical signals in the first optical signal set are converted according to the conversion coefficient so that the brightness of each pixel of the foreground image can be aligned to the brightness of the second color display standard, thereby avoiding abnormal brightness of the foreground image.

Since the optical signals in the first optical signal set are the optical signals under the second color display standard, the optical signals in the second optical signal set obtained by conversion are still under the second color display standard.

S14: converting colors of pixels of the background image from colors in a second color space of the second color display standard into optical signals under the second color display standard to obtain a third optical signal set.

The background image in the embodiment of the present disclosure refers to an image needed to be set under the foreground image in fusion. The background image may be any image under the second color display standard. The embodiments of the present disclosure have no limitation on the type of the background image.

S15: fusing the optical signals in the second optical signal set and the third optical signal set based on a light transmittance of the foreground image to obtain a fourth optical signal set.

Specifically, the light transmittance of the foreground image may be a light transmittance set by a person editing images as needed or a default light transmittance. Exemplarily, the light transmittance of the foreground image may be 50%, 80%, or the like.

It needs to be noted that the light transmittance may be the same at each position of the foreground image, or the foreground image may be divided into a plurality of regions and a different light transmittance is set for each region.

Since the optical signals in the second optical signal set and the optical signals in the third optical signal set are all optical signals under the second color display standard, the optical signals in the second optical signal are still the optical signals under the second color display standard.

S16: converting the optical signals in the fourth optical signal set into the colors in the second color space to obtain the fused image of the foreground image and the background image.

The image processing method provided in the embodiments of the present disclosure includes: converting colors of pixels of a foreground image from colors in a first color space of a first color display standard into optical signals under a second color display standard to obtain a first optical signal set; obtaining a conversion coefficient according to a peak brightness of the second color display standard and a peak brightness of a target display device, and converting the optical signals in the first optical signal set according to the conversion coefficient to obtain a second optical signal set; converting colors of pixels of the background image from colors in a second color space of the second color display standard into optical signals under the second color display standard to obtain a third optical signal set; fusing the optical signals in the second optical signal set and the third optical signal set based on a light transmittance of the foreground image to obtain a fourth optical signal set; and converting the optical signals in the fourth optical signal set into the colors in the second color space to obtain the fused image of the foreground image and the background image.

On the one hand, the image processing method provided in the embodiments of the present disclosure is capable of converting the foreground image of the first color display standard and the background image of the second color display standard into the optical signals under the second color display standard before fusion. Therefore, an anomaly caused by a color gamut difference between the foreground image and the background image can be avoided in the embodiments of the present disclosure. On the other hand, the image processing method provided in the embodiments of the present disclosure, after converting the foreground image into the optical signals of the second color display standard, may further obtain the conversion coefficient according to the peak brightness of the second color display standard and the peak brightness of the target display device and converts the optical signals in the first optical signal set according to the conversion coefficient. Therefore, the brightness of the foreground image may be aligned to the color display standard with which the background image complies based on the brightness of the target display device in the embodiments of the present disclosure, thus avoiding an anomaly caused by abnormal brightness of the foreground image and the background image. In conclusion, the image processing method provided in the embodiments of the present disclosure is capable of avoiding the anomalies caused by the color gamut difference and the abnormal brightness of the foreground image and the background image and solves the problem of an anomaly of a fused image caused by the superposition and fusion of images under different color display standards.

As expansion and subdivision of the foregoing embodiments, an embodiment of the present disclosure provides another image processing method. With reference to the flowchart shown in FIG. 2 and the schematic diagram of a data flow shown in FIG. 3, the image processing method includes the following steps.

S201: converting the colors of the pixels of the foreground image into optical signals under the first color display standard based on an electro-optical transfer function of the first color display standard to obtain a fifth optical signal set.

Specifically, the electro-optical transfer function of the first color display standard in the embodiment of the present disclosure refers to a function for describing a relationship between a nonlinear color value (a numeric-coded pixel value, an electrical signal) input a display and a linear color value (an optical signal) displayed on the display.

Since a device stores and transmits electrical signals (color values) and different electro-optical transfer functions of different color display standards are different, when the colors (electric signals) of the pixels of the foreground image of the first color display standard are converted into the optical signals in the second color space, the colors of the pixels of the foreground image need to be converted into the optical signals under the first color display standard first to realize conversion of the color values of different color spaces in a linear space.

Exemplarily, step S201 is described below by taking for example that the first color display standard is the SDR color display standard and the first color space is bt.2020.

An opto-electrical transfer function of the SDR color display standard is as follows:

$$L_c = a\{\max[(V + b), 0]\}^\gamma,$$

$$a = \left(L_\omega^{\frac{1}{\gamma}} - L_b^{\frac{1}{\gamma}}\right)^\gamma,$$

$$b = \frac{L_b^{\frac{1}{\gamma}}}{L_\omega^{\frac{1}{\gamma}} - L_b^{\frac{1}{\gamma}}},$$

where V represents an electrical signal under the first color display standard; $L_c$ represents an optical signal under the first color display standard; $L_\omega$ represents an optical signal corresponding to a maximum value of electrical signals; $L_b$ represents an optical signal corresponding to a minimum value of electrical signals; and $\gamma$ is a constant.

Alternatively, the optical signal $L_\omega$ corresponding to the maximum value of electrical signals and the optical signal $L_b$ corresponding to the minimum value of electrical signals may be normalized. That is, letting $L_b=0$ and $L_\omega=1$, the optical signals corresponding to other electrical signals are between 0 and 1 in the form of floating points.

The color of each pixel in the foreground image can be converted into an optical light $L_{709sticker}(x,y)$ under the first color display standard by substituting each of a red component $R_{709sticker}(x,y)$, a green component $G_{709sticker}(x,y)$, and a blue component $B_{709sticker}(x,y)$ of the color $C_{709sticker}(x,y)$ of each pixel in the foreground image as an electrical signal $V$ into the electro-optical transfer function, and the fifth optical signal set can thus be obtained.

S202: converting the optical signals in the fifth optical signal set into the optical signals under the second color display standard to obtain the first optical signal set.

Specifically, each optical signal in the first optical signal set is the optical signal under the first color display standard. Therefore, the optical signals under the first color display standard are converted into the optical signals under the second color display standard at step S202. There may be a particular conversion matrix for the optical signals under different color display standards. By the corresponding conversion matrix, the optical signals under the first color display standard may be converted into the optical signals under the second color display standard.

Exemplarily, when the first color display standard is the SDR color display standard and the second standard is the PQ color display standard, an optical signal under the SDR color display standard is expressed as $L_{709sticker}(x,y)$ and an optical signal under the PQ color display standard obtained by converting $L_{709sticker}(x,y)$ is expressed as $L_{2020sticker}(x,y)$, and the following equation may be established:

$$L_{2020sticker}(x, y) = \begin{vmatrix} 0.6274 & 0.3293 & 0.0433 \\ 0.0691 & 0.9195 & 0.0114 \\ 0.0164 & 0.0880 & 0.8956 \end{vmatrix} \times L_{709sticker}(x, y).$$

The optical signals $L_{709sticker}(x,y)$ in the fifth optical signal set are substituted to the above conversion equation one by one so that the optical signals in the fifth optical signal set can be converted into the optical signals $L_{2020sticker}(x,y)$ under the second color display standard, thereby obtaining the first optical signal set.

By the steps S201 and S202, it is realized in the embodiments of the present disclosure that the colors of the pixels of the foreground image are converted from the colors in the first color space of the first color display standard into the optical signals under the second color display standard to obtain the first optical signal set.

S203: obtaining a ratio of the peak brightness of the target display device to the peak brightness of the second color display standard as the conversion coefficient.

Letting the conversion coefficient be A, the peak brightness of the target display device be $Nit_{Typical}$, and the peak brightness of the second color display standard be $Nit_{PQPeak}$, the following equation is established:

$$A = Nit_{Typical}/Nit_{PQPeak}$$

By the above step S203, it is realized in the embodiment of the present disclosure that the conversion coefficient is obtained according to the peak brightness of the second color display standard and the peak brightness of the target display device.

S204: converting the optical signals in the first optical signal set into products of the optical signals in the first optical signal set and the conversion coefficient to obtain the second optical signal set.

That is, the conversion coefficient A, the optical signal $L_{2020sticker}(x,y)$ in the first optical signal set, and the optical signal $L_{Typical}(x,y)$ in the second optical signal set meet the following conversion equation:

$$L_{Typical}(x, y) = L_{2020sticker}(x, y) * A = L_{2020sticker}(x, y) * Nit_{Typical}/Nit_{PQPeak}$$

The optical signals $L_{2020sticker}(x,y)$ in the first optical signal set are substituted to the above conversion equation one by one so that the optical signals in the first optical signal set can be converted into the products $L_{Typical}(x,y)$ of the optical signals in the first optical signal set and the conversion coefficient, thereby obtaining the second optical signal set.

By the above step S204, it is realized in the embodiment of the present disclosure that the optical signals in the first optical signal set are converted according to the conversion coefficient to obtain the second optical signal set.

S205: converting the colors of the pixels of the background image into the optical signals under the second color display standard based on an electro-optical transfer function of the second color display standard to obtain the third optical signal set.

Exemplarily, step S205 is described below by taking for example that the second color display standard is the PQ color display standard.

The electro-optical transfer function of the PQ color display standard is as follows:

$$L_c = 10000 \times \left\{ \frac{\max\left[\left(V^{1/m_2} - c_1\right), 0\right]}{c_2 - c_3 V^{1/m_2}} \right\}^{1/m_1}$$

$$\begin{cases} m_1 = 0.1593017578125 \\ m_2 = 78.84375 \\ c_2 = 18.8515625 \\ c_3 = 18.6875 \\ c_1 = c_3 - c_2 + 1.0 \end{cases},$$

where V represents an electrical signal under the PQ color display standard; and $L_c$ represents an optical signal under the PQ color display standard. The color $C_{2020imgIn}(x,y)$ of each pixel in the background image can be converted into an optical light $L_{2020imgIn}(x,y)$ under the second color display standard by substituting each of a red component $R_{2020imgIn}(x,y)$, a green component $G_{2020imgIn}(x,y)$, and a blue component $B_{2020imgIn}(x,y)$ of the color $C_{2020imgIn}(x,y)$ of each pixel in the background image as an electrical signal V into the above equation, and the third optical signal set can thus be obtained.

By the above step S205, it is realized in the embodiment of the present disclosure that the colors of the pixels of the background image are converted from the colors in the second color space of the second color display standard into the optical signals under the second color display standard.

S206: fusing the optical signals in the second optical signal set and the third optical signal set based on the light transmittance of the foreground image to obtain the fourth optical signal set.

As an alternative implementation of the embodiment of the present disclosure, step S206 (the optical signals in the second optical signal set and the third optical signal set are fused based on the light transmittance of the foreground image to obtain the fourth optical signal set) may be implemented by: performing weighted fusion on the optical signals having same pixel coordinates in the second optical signal set and the third optical signal set based on the light transmittance of the foreground image to obtain a fused optical signal set; and generating the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set.

Alternatively, generating the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set may be implemented by: adding the optical signals having different pixel coordinates from any optical signal in the third optical signal set among the optical signals in the second optical signal set and the optical signals having different pixel coordinates from any optical signal in the second optical signal set among the optical signals in the third optical signal set to the fused optical signal set to generate the fourth optical signal set.

Figure 4:
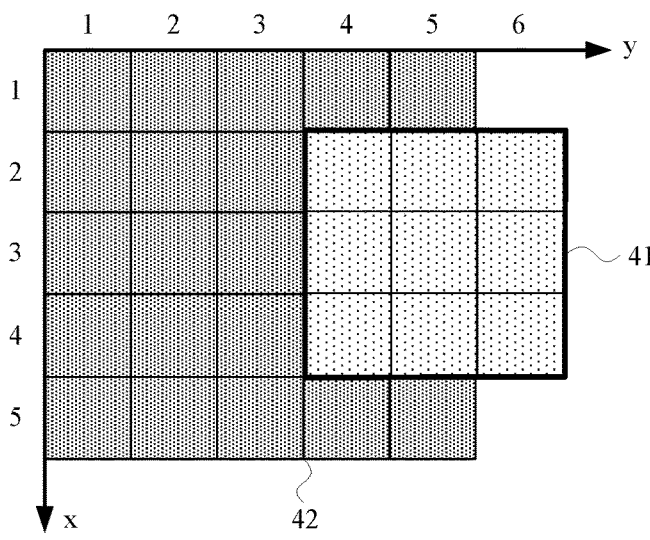
FIG. 4 is a schematic diagram of a positional relationship of a foreground image and a background image provided in an embodiment of the present disclosure.

Exemplarily, as shown in FIG. 4, the embodiment of the present disclosure is described by taking for example that the background image 41 includes 5*5 pixels and the foreground image 42 includes 3*3 pixels in FIG. 4. The optical signals $L_{Typical}(2,4)$, $L_{Typical}(2,5)$, $L_{Typical}(3,4)$, $L_{Typical}(3,5)$, $L_{Typical}(4,4)$, and $L_{Typical}(4,5)$ in the second light signal set have same pixel coordinates with the optical signals $L_{2020imgIn}(2,4)$, $L_{2020imgIn}(2,5)$, $L_{2020imgIn}(3,4)$, $L_{2020imgIn}(3,5)$, $L_{2020imgIn}(4,4)$, and $L_{2020imgIn}(4,5)$ in the third optical signal set, respectively. Weighted fusion is performed on $L_{Typical}(2,4)$ and $L_{2020imgIn}(2,4)$, $L_{Typical}(2,5)$ and $L_{2020imgIn}(2,5)$, $L_{Typical}(3,4)$ and $L_{2020imgIn}(3,4)$, $L_{Typical}(3,5)$ and $L_{2020imgIn}(3,5)$, $L_{Typical}(4,4)$ and $L_{2020imgIn}(4,4)$, and $L_{Typical}(4,5)$ and $L_{2020imgIn}(4,5)$ based on the light transmittance of the foreground image to obtain the fused optical signal set $\{L_{2020imgOut}(2,4)$, $L_{2020imgOut}(2,5)$, $L_{2020imgOut}(3,4)$, $L_{2020imgOut}(3,5)$, $L_{2020imgOut}(4,4)$, $L_{2020imgOut}(4,5)\}$.

Alternatively, performing weighted fusion on the optical signals having same pixel coordinates in the second optical signal set and the third optical signal set based on the light transmittance of the foreground image to obtain the fused optical signal set includes the following steps a to d.

Step a: obtaining a weight value of a first optical signal in the second optical signal set.

The weight value of the first optical signal is a product of the first optical signal and a shading rate of the foreground image. The shading rate of the foreground image is a difference between 1 and the light transmittance of the foreground image.

Letting the weight value of the first optical signal be $P_{1\_(x,y)}$ and the light transmittance of the foreground image be q, the weight value of the first optical signal may be obtained by:

$$P_{1\_(x,y)} = L_{Typical}(x, y) * (1 - q)$$

Step b: obtaining a weight value of a second optical signal in the third optical signal set.

The second optical signal is an optical signal having same pixel coordinates with the first optical signal, and the weight value of the second optical signal is a product of the second optical signal and the light transmittance of the foreground image.

Letting the weight value of the second optical signal be $P_{2\_(x,y)}$ and the light transmittance of the foreground image be q, the weight value of the second optical signal may be obtained by:

$$P_{2\_(x,y)} = L_{2020imgIn}(x, y) * q$$

Step c: obtaining a sum of the weight value of the first optical signal and the weight value of the second optical signal as a fusion result of the first optical signal and the second optical signal.

$$L_{2020imgOut}(x, y) = L_{Typical}(x, y) * (1 - q) + L_{2020imgIn}(x, y) * q$$

Step d: generating the fused optical signal set according to fusion results of the optical signals having the same pixel coordinates in the second optical signal set and the third optical signal set.

That is, the fusion result of each pair of optical signals having the same pixel coordinates is obtained by step a to step d, and then the fusion results of all the pairs of optical signals having the same pixel coordinates are combined into the fused optical signal set.

Further referring to FIG. 4, the optical signals having different pixel coordinates from any optical signal in the third optical signal set among the optical signals in the second optical signal set include $L_{Typical}(2,6)$, $L_{Typical}(3,6)$, and $L_{Typical}(4,6)$, and the optical signals having different pixel coordinates from any optical signal in the second optical signal set among the optical signals in the third optical signal set include $L_{2020imgIn}(1,1)$, $L_{2020imgIn}(1,2)$, $L_{2020imgIn}(1,3)$, $L_{2020imgIn}(1,4)$, $L_{2020imgIn}(1,5)$, $L_{2020imgIn}(2,1)$, $L_{2020imgIn}(2,2)$, $L_{2020imgIn}(2,3)$, $L_{2020imgIn}(3,1)$, $L_{2020imgIn}(3,2)$, $L_{2020imgIn}(3,3)$, $L_{2020imgIn}(4,1)$, $L_{2020imgIn}(4,2)$, $L_{2020imgIn}(4,3)$, $L_{2020imgIn}(5,1)$, $L_{2020imgIn}(5,2)$, $L_{2020imgIn}(5,3)$, $L_{2020imgIn}(5,4)$, and $L_{2020imgIn}(5,5)$. Therefore, the fourth optical signal set is generated according to the fused optical signal set $\{L_{2020imgOut}(2,4)$, $L_{2020imgOut}(2,5)$, $L_{2020imgOut}(3,4)$, $L_{2020imgOut}(3,5)$, $L_{2020imgOut}(4,4)$, $L_{2020imgOut}(4,5)$, $L_{Typical}(2,6)$, $L_{Typical}(3,6)$, $L_{Typical}(4,6)$, $L_{2020imgIn}(1,1)$, $L_{2020imgIn}(1,2)$, $L_{2020imgIn}(1,3)$, $L_{2020imgIn}(1,4)$, $L_{2020imgIn}(1,5)$, $L_{2020imgIn}(2,1)$, $L_{2020imgIn}(2,2)$, $L_{2020imgIn}(2,3)$, $L_{2020imgIn}(3,1)$, $L_{2020imgIn}(3,2)$, $L_{2020imgIn}(3,3)$, $L_{2020imgIn}(4,1)$, $L_{2020imgIn}(4,2)$, $L_{2020imgIn}(4,3)$, $L_{2020imgIn}(5,1)$, $L_{2020imgIn}(5,2)$, $L_{2020imgIn}(5,3)$, $L_{2020imgIn}(5,4)$, $L_{2020imgIn}(5,5)\}$.

Finally, the obtained fourth optical signal set is {$L_{2020imgOut}$(2,4), $L_{2020imgOut}$(2,5), $L_{2020imgOut}$(3,4), $L_{2020imgOut}$(3,5), $L_{2020imgOut}$(4,4), $L_{2020imgOut}$(4,5), $L_{2020imgIn}$(1,1), $L_{2020imgIn}$(1,2), $L_{2020imgIn}$(1,3), $L_{2020imgIn}$(1,4), $L_{2020imgIn}$(1,5), $L_{2020imgIn}$(2,1), $L_{2020imgIn}$(2,2), $L_{2020imgIn}$(2,3), $L_{2020imgIn}$(3,1), $L_{2020imgIn}$(3,2), $L_{2020imgIn}$(3,3), $L_{2020imgIn}$(4,1), $L_{2020imgIn}$(4,2), $L_{2020imgIn}$(4,3), $L_{2020imgIn}$(5,1), $L_{2020imgIn}$(5,2), $L_{2020imgIn}$(5,3), $L_{2020imgIn}$(5,4), $L_{2020imgIn}$(5,5), $L_{Typical}$(2,6), $L_{Typical}$(3,6), $L_{Typical}$(4,6)}.

S207: converting the optical signals in the fourth optical signal set into the colors in the second color space based on an opto-electrical transfer function of the second color display standard to obtain a target color set.

When the second color display standard is the PQ color display standard, the conversion relationship between each optical signal in the fourth optical signal set and a color in the second color space follows the following equation:

$$V = \left( \frac{c_1 + c_2 L_c^{m_1}/10000}{1 + c_3 L_c^{m_1}/10000} \right)^{m_2}$$

$$\begin{cases} m_1 = 0.1593017578125 \\ m_2 = 78.84375 \\ c_2 = 18.8515625 \\ c_3 = 18.6875 \\ c_1 = c_3 - c_2 + 1.0 \end{cases}$$

Red components, green components, and blue components of the optical signals $L_{2020imgOut}$(x,y) in the fourth optical signal set are substituted as $L_c$ into the above equation one by one, and the optical signals in the fourth optical signal set are thus converted into the colors $C_{2020imgOut}$(x,y) in the second color space.

S208: obtaining the fused image of the foreground image and the background image according to the colors in the target color set and pixel coordinates of the colors in the target color set.

Further, the colors in the second color space converted from the optical signals in the fourth optical signal set are arranged according to the pixel coordinates so that the fused image of the foreground image and the background image can be obtained.

By the above steps S207 and S208, it is realized in the embodiments of the present disclosure that the optical signals in the fourth optical signal set are converted into the colors in the second color space to obtain the fused image of the foreground image and the background image.

The image processing method provided in the embodiments of the present disclosure includes: converting colors of pixels of a foreground image from colors in a first color space of a first color display standard into optical signals under a second color display standard to obtain a first optical signal set; obtaining a conversion coefficient according to a peak brightness of the second color display standard and a peak brightness of a target display device, and converting the optical signals in the first optical signal set according to the conversion coefficient to obtain a second optical signal set; converting colors of pixels of the background image from colors in a second color space of the second color display standard into optical signals under the second color display standard to obtain a third optical signal set; fusing the optical signals in the second optical signal set and the third optical signal set based on a light transmittance of the foreground image to obtain a fourth optical signal set; and converting the optical signals in the fourth optical signal set into the colors in the second color space to obtain the fused image of the foreground image and the background image.

On the one hand, the image processing method provided in the embodiments of the present disclosure is capable of converting the foreground image of the first color display standard and the background image of the second color display standard into the optical signals under the second color display standard before fusion. Therefore, an anomaly caused by a color gamut difference of the foreground image can be avoided in the embodiments of the present disclosure. On the other hand, the image processing method provided in the embodiments of the present disclosure, after converting the foreground image into the optical signals of the second color display standard, may further obtain the conversion coefficient according to the peak brightness of the second color display standard and the peak brightness of the target display device and converts the optical signals in the first optical signal set according to the conversion coefficient. Therefore, the brightness of the foreground image may be aligned to the color display standard with which the background image complies based on the brightness of the target display device in the embodiments of the present disclosure, thus avoiding an anomaly caused by abnormal brightness of the foreground image. In conclusion, the image processing method provided in the embodiments of the present disclosure is capable of avoiding the anomalies caused by the color gamut difference and the abnormal brightness of the foreground image and solves the problem of an anomaly of a fused image caused by the superposition and fusion of images under different color display standards.

Based on the same inventive concept, as an implementation of the image processing method, an embodiment of the present disclosure further provides an image processing apparatus. The apparatus embodiments correspond to the foregoing method embodiments. For ease of reading, the apparatus embodiments do not present the details in the foregoing method embodiments. However, it will be clear that the image processing apparatus in the present embodiment can correspond to all the contents in the foregoing method embodiments.

Figure 5:
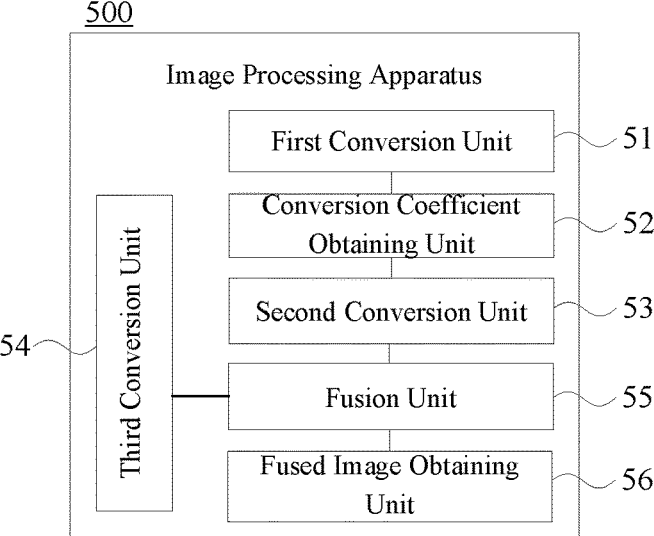
FIG. 5 is a structural schematic diagram of an image processing apparatus provided in an embodiment of the present disclosure.

An embodiment of the present disclosure provides an image processing apparatus. FIG. 5 is a structural schematic diagram of the image processing apparatus. As shown in FIG. 5, the image processing apparatus 500 includes: a first conversion unit 51 configured to convert colors of pixels of a foreground image from colors in a first color space of a first color display standard into optical signals under a second color display standard to obtain a first optical signal set; a conversion coefficient obtaining unit 52 configured to obtain a conversion coefficient according to a peak brightness of the second color display standard and a peak brightness of a target display device, where the target display device is a device for displaying a fused image of the foreground image and a background image; a second conversion unit 53 configured to convert the optical signals in the first optical signal set according to the conversion coefficient to obtain a second optical signal set; a third conversion unit 54 configured to convert colors of pixels of the background image from colors in a second color space of the second color display standard into optical signals under the second color display standard to obtain a third optical signal set; a fusion unit 55 configured to fuse the optical signals in the second optical signal set and the third optical signal set based on a light transmittance of the foreground image to obtain a fourth optical signal set; and a fused image obtaining unit 56 configured to convert the optical signals in the fourth optical signal set into the colors in the second color space to obtain the fused image of the foreground image and the background image.

As an alternative implementation of the embodiment of the present disclosure, the first conversion unit 51 may be configured to convert the colors of the pixels of the foreground image into optical signals under the first color display standard based on an electro-optical transfer function of the first color display standard to obtain a fifth optical signal set; and convert the optical signals in the fifth optical signal set into the optical signals under the second color display standard to obtain the first optical signal set.

As an alternative implementation of the embodiment of the present disclosure, the conversion coefficient obtaining unit 52 may be configured to obtain a ratio of the peak brightness of the target display device to the peak brightness of the second color display standard as the conversion coefficient.

As an alternative implementation of the embodiment of the present disclosure, the second conversion unit 53 may be configured to convert the optical signals in the first optical signal set into products of the optical signals in the first optical signal set and the conversion coefficient to obtain the second optical signal set.

As an alternative implementation of the embodiment of the present disclosure, the third conversion unit 54 may be configured to convert the colors of the pixels of the background image into the optical signals under the second color display standard based on an electro-optical transfer function of the second color display standard.

As an alternative implementation of the embodiment of the present disclosure, the fusion unit 55 may be configured to: perform weighted fusion on the optical signals having same pixel coordinates in the second optical signal set and the third optical signal set based on the light transmittance of the foreground image to obtain a fused optical signal set; and generate the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set.

As an alternative implementation of the embodiment of the present disclosure, the fusion unit 55 may be configured to: obtain a weight value of a first optical signal in the second optical signal set, where the weight value of the first optical signal is a product of the first optical signal and a shading rate of the foreground image, and the shading rate of the foreground image is a difference between 1 and the light transmittance of the foreground image; obtain a weight value of a second optical signal in the third optical signal set, where the second optical signal is an optical signal having same pixel coordinates with the first optical signal, and the weight value of the second optical signal is a product of the second optical signal and the light transmittance of the foreground image; obtain a sum of the weight value of the first optical signal and the weight value of the second optical signal as a fusion result of the first optical signal and the second optical signal; and generate the fused optical signal set according to fusion results of the optical signals having the same pixel coordinates in the second optical signal set and the third optical signal set.

As an alternative implementation of the embodiment of the present disclosure, the fused image obtaining unit 56 may be configured to: convert the optical signals in the fourth optical signal set into the colors in the second color space based on an opto-electrical transfer function of the second color display standard to obtain a target color set; and obtain the fused image of the foreground image and the background image according to the colors in the target color set and pixel coordinates of the colors in the target color set.

As an alternative implementation of the embodiment of the present disclosure, the first color display standard is an SDR color display standard; and the second color display standard is a PQ color display standard.

The image processing apparatus provided in the present embodiment can perform the image processing method provided in the foregoing method embodiments, and the implementation principles and technical effects are similar, which will not be described herein.

Figure 6:
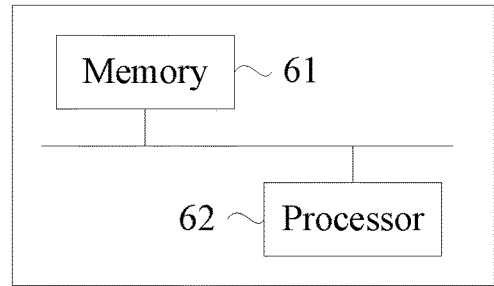
FIG. 6 is a schematic diagram of a hardware structure of an electronic device provided in an embodiment of the present disclosure.

Based on the same inventive concept, an embodiment of the present disclosure further provides an electronic device. FIG. 6 is a schematic diagram of an electronic device provided in an embodiment of the present disclosure. As shown in FIG. 6, the electronic device provided in the present embodiment includes a memory and 61 a processor 62, where the memory 61 is configured to store a computer program; and the processor 62 is configured to, when executing the computer program, cause the electronic device to implement the image processing method provided in the foregoing embodiments.

An embodiment of the present disclosure further provides a computer-readable storage medium. A computer program is stored on the computer-readable storage medium, and when the computer program is executed by a computing device, the image processing method provided in the foregoing embodiments is implemented by the computing device.

An embodiment of the present disclosure further provides a computer program product and when the computer program product is run on a computer, the image processing method provided in the foregoing embodiments is implemented by the computer.

Those skilled in the art will understand that the embodiments of the present disclosure may be provided as a method, a system, or a computer program product. Therefore, the embodiments of the present disclosure may take the form of hardware only embodiments, software only embodiments, or embodiments with a combination of software and hardware. Moreover, the embodiments of the present disclosure may take the form of a computer program product that is implemented on one or more computer-usable storage media that include computer-usable program code.

The processor may be a central processing unit (CPU), and may also be other general-purpose processor, a digital signal processor (DSP), an application specific integrated circuit (ASIC), a field-programmable gate array (FPGA) or other programmable logic device, a discrete gate, a transistor logic device, a discrete hardware component, etc. The general-purpose processor may be a microprocessor, or the processor may be any conventional processor, etc.

The memory may include a non-permanent memory in a computer-readable medium and may take the form of a random access memory (RAM) and/or a non-volatile memory, such as a read only memory (ROM) or a flash RAM. The memory is an example of the computer-readable medium.

The computer-readable medium includes permanent and non-permanent, removable and non-removable storage mediums. The storage medium may realize information storage by any method or technique. The information may be computer-readable instructions, data structures, program modules, or other data. Examples of the storage medium of the computer include but are not limited to a phase-change RAM (PRAM), a static random access memory (SRAM), a dynamic random access memory (DRAM), other types of RAMs and ROMs, an electrically erasable programmable read-only memory (EEPROM), a flash memory or other memory techniques, a compact disk read-only memory (CD-ROM), a digital versatile disc (DVD), or other optical storage, a cassette type magnetic tape, disk storage, or other magnetic storage device, or other non-transmission medium, that can be used to store information accessible by computing devices. According to the definitions herein, the computer-readable medium does not include transitory computer-readable media, such as modulated data signals and carriers.

Finally, it should be noted that the foregoing embodiments are merely intended to describe rather than limit the technical solutions of the embodiments of the present disclosure. Although the embodiments of the present disclosure are described in detail with reference to the foregoing embodiments, those of ordinary skill in the art should understand that they can still modify the technical solutions described in the foregoing embodiments, or make equivalent replacements to some technical features therein. These modifications or replacements do not cause the essence of the corresponding technical solutions to deviate from the scope of the technical solutions of the embodiments of the present disclosure.

The invention claimed is:

1. An image processing method, comprising:
converting colors of pixels of a foreground image from colors in a first color space of a first color display standard into optical signals under a second color display standard to obtain a first optical signal set;
obtaining a conversion coefficient according to a peak brightness of the second color display standard and a peak brightness of a target display device, wherein the target display device is a device for displaying a fused image of the foreground image and a background image;
converting the optical signals in the first optical signal set according to the conversion coefficient to obtain a second optical signal set;
converting colors of pixels of the background image from colors in a second color space of the second color display standard into optical signals under the second color display standard to obtain a third optical signal set;
fusing optical signals in the second optical signal set and the third optical signal set based on a light transmittance of the foreground image to obtain a fourth optical signal set, comprising:
performing weighted fusion on optical signals having same pixel coordinates in the second optical signal set and the third optical signal set based on the light transmittance of the foreground image to obtain a fused optical signal set; and
generating the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set; and

converting optical signals in the fourth optical signal set into colors in the second color space to obtain the fused image of the foreground image and the background image.

2. The image processing method according to claim 1, wherein the converting colors of pixels of a foreground image from colors in a first color space of a first color display standard into optical signals under a second color display standard to obtain a first optical signal set comprises:
converting the colors of the pixels of the foreground image into optical signals under the first color display standard based on an electro-optical transfer function of the first color display standard to obtain a fifth optical signal set; and
converting the optical signals in the fifth optical signal set into the optical signals under the second color display standard to obtain the first optical signal set.

3. The image processing method according to claim 1, wherein the obtaining a conversion coefficient according to a peak brightness of the second color display standard and a peak brightness of a target display device comprises:
obtaining a ratio of the peak brightness of the target display device to the peak brightness of the second color display standard as the conversion coefficient.

4. The image processing method according to claim 1, wherein the converting the optical signals in the first optical signal set according to the conversion coefficient to obtain a second optical signal set comprises:
converting the optical signals in the first optical signal set into products of the optical signals in the first optical signal set and the conversion coefficient to obtain the second optical signal set.

5. The image processing method according to claim 1, wherein the converting colors of pixels of the background image from colors in a second color space of the second color display standard into optical signals under the second color display standard comprises:
converting the colors of the pixels of the background image into the optical signals under the second color display standard based on an electro-optical transfer function of the second color display standard.

6. The image processing method according to claim 1, wherein the performing weighted fusion on the optical signals having same pixel coordinates in the second optical signal set and the third optical signal set based on the light transmittance of the foreground image to obtain a fused optical signal set comprises:
obtaining a weight value of a first optical signal in the second optical signal set, wherein the weight value of the first optical signal is a product of the first optical signal and a shading rate of the foreground image, and the shading rate of the foreground image is a difference between 1 and the light transmittance of the foreground image;
obtaining a weight value of a second optical signal in the third optical signal set, wherein the second optical signal is an optical signal having same pixel coordinates with the first optical signal, and the weight value of the second optical signal is a product of the second optical signal and the light transmittance of the foreground image;
obtaining a sum of the weight value of the first optical signal and the weight value of the second optical signal as a fusion result of the first optical signal and the second optical signal; and generating the fused optical signal set according to fusion results of optical signals having same pixel coordinates in the second optical signal set and in the third optical signal set.

7. The image processing method according to claim 1, wherein the converting the optical signals in the fourth optical signal set into the colors in the second color space to obtain the fused image of the foreground image and the background image comprises:

converting the optical signals in the fourth optical signal set into the colors in the second color space based on an opto-electrical transfer function of the second color display standard to obtain a target color set; and obtaining the fused image of the foreground image and the background image according to colors in the target color set and pixel coordinates of the colors in the target color set.

8. The image processing method according to claim 1, wherein the first color display standard is a standard dynamic range (SDR) color display standard; and the second color display standard is a high dynamic range (HDR) color display standard.

9. A computer-readable storage medium, storing a computer program, wherein the image processing method according to claim 1 is implemented by a computing device when the computer program is executed by the computing device.

10. The computer-readable storage medium according to claim 9, wherein the converting colors of pixels of a foreground image from colors in a first color space of a first color display standard into optical signals under a second color display standard to obtain a first optical signal set comprises:

converting the colors of the pixels of the foreground image into optical signals under the first color display standard based on an electro-optical transfer function of the first color display standard to obtain a fifth optical signal set; and converting the optical signals in the fifth optical signal set into the optical signals under the second color display standard to obtain the first optical signal set.

11. The computer-readable storage medium according to claim 9, wherein the obtaining a conversion coefficient according to a peak brightness of the second color display standard and a peak brightness of a target display device comprises:

obtaining a ratio of the peak brightness of the target display device to the peak brightness of the second color display standard as the conversion coefficient.

12. An image processing apparatus, comprising:

a first conversion unit configured to convert colors of pixels of a foreground image from colors in a first color space of a first color display standard into optical signals under a second color display standard to obtain a first optical signal set;

a conversion coefficient obtaining unit configured to obtain a conversion coefficient according to a peak brightness of the second color display standard and a peak brightness of a target display device, wherein the target display device is a device for displaying a fused image of the foreground image and a background image;

a second conversion unit configured to convert the optical signals in the first optical signal set according to the conversion coefficient to obtain a second optical signal set;

a third conversion unit configured to convert colors of pixels of the background image from colors in a second color space of the second color display standard into optical signals under the second color display standard to obtain a third optical signal set;

a fusion unit configured to fuse optical signals in the second optical signal set and the third optical signal set based on a light transmittance of the foreground image to obtain a fourth optical signal set, wherein the fusion unit is specifically configured to perform weighted fusion on optical signals having same pixel coordinates in the second optical signal set and the third optical signal set based on the light transmittance of the foreground image to obtain a fused optical signal set; and generate the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set; and a fused image obtaining unit configured to convert optical signals in the fourth optical signal set into the colors in the second color space to obtain the fused image of the foreground image and the background image.

13. An electronic device, comprising a memory and a processor, wherein the memory is configured to store a computer program; and the processor is configured to, when executing the computer program, enable the electronic device to implement an image processing method comprising:

converting colors of pixels of a foreground image from colors in a first color space of a first color display standard into optical signals under a second color display standard to obtain a first optical signal set;

obtaining a conversion coefficient according to a peak brightness of the second color display standard and a peak brightness of a target display device, wherein the target display device is a device for displaying a fused image of the foreground image and a background image;

converting the optical signals in the first optical signal set according to the conversion coefficient to obtain a second optical signal set;

converting colors of pixels of the background image from colors in a second color space of the second color display standard into optical signals under the second color display standard to obtain a third optical signal set;

fusing optical signals in the second optical signal set and the third optical signal set based on a light transmittance of the foreground image to obtain a fourth optical signal set, comprising:

performing weighted fusion on optical signals having same pixel coordinates in the second optical signal set and the third optical signal set based on the light transmittance of the foreground image to obtain a fused optical signal set; and generating the fourth optical signal set according to the fused optical signal set, optical signals having different pixel coordinates from any optical signal in the third optical signal set among the optical signals in the second optical signal set, and optical signals having different pixel coordinates from any optical signal in the second optical signal set among the optical signals in the third optical signal set; and converting optical signals in the fourth optical signal set into colors in the second color space to obtain the fused image of the foreground image and the background image.

14. The electronic device according to claim 13, wherein the converting colors of pixels of a foreground image from colors in a first color space of a first color display standard into optical signals under a second color display standard to obtain a first optical signal set comprises:

converting the colors of the pixels of the foreground image into optical signals under the first color display standard based on an electro-optical transfer function of the first color display standard to obtain a fifth optical signal set; and converting the optical signals in the fifth optical signal set into the optical signals under the second color display standard to obtain the first optical signal set.

15. The electronic device according to claim 13, wherein the obtaining a conversion coefficient according to a peak brightness of the second color display standard and a peak brightness of a target display device comprises:

obtaining a ratio of the peak brightness of the target display device to the peak brightness of the second color display standard as the conversion coefficient.

16. The electronic device according to claim 13, wherein the converting the optical signals in the first optical signal set according to the conversion coefficient to obtain a second optical signal set comprises:

converting the optical signals in the first optical signal set into products of the optical signals in the first optical signal set and the conversion coefficient to obtain the second optical signal set.

17. The electronic device according to claim 13, wherein the converting colors of pixels of the background image from colors in a second color space of the second color display standard into optical signals under the second color display standard comprises:

converting the colors of the pixels of the background image into the optical signals under the second color display standard based on an electro-optical transfer function of the second color display standard.

18. The electronic device according to claim 13, wherein the performing weighted fusion on the optical signals having same pixel coordinates in the second optical signal set and the third optical signal set based on the light transmittance of the foreground image to obtain a fused optical signal set comprises:

obtaining a weight value of a first optical signal in the second optical signal set, wherein the weight value of the first optical signal is a product of the first optical signal and a shading rate of the foreground image, and the shading rate of the foreground image is a difference between 1 and the light transmittance of the foreground image;

obtaining a weight value of a second optical signal in the third optical signal set, wherein the second optical signal is an optical signal having same pixel coordinates with the first optical signal, and the weight value of the second optical signal is a product of the second optical signal and the light transmittance of the foreground image;

obtaining a sum of the weight value of the first optical signal and the weight value of the second optical signal as a fusion result of the first optical signal and the second optical signal; and generating the fused optical signal set according to fusion results of optical signals having same pixel coordinates in the second optical signal set and in the third optical signal set.

19. The electronic device according to claim 13, wherein the converting the optical signals in the fourth optical signal set into the colors in the second color space to obtain the fused image of the foreground image and the background image comprises:

converting the optical signals in the fourth optical signal set into the colors in the second color space based on an opto-electrical transfer function of the second color display standard to obtain a target color set; and obtaining the fused image of the foreground image and the background image according to colors in the target color set and pixel coordinates of the colors in the target color set.

20. The electronic device according to claim 13, wherein the first color display standard is a standard dynamic range (SDR) color display standard; and the second color display standard is a high dynamic range (HDR) color display standard.

* * * * *